United States Patent [19]
Fargo et al.

[11] Patent Number: 5,101,930
[45] Date of Patent: Apr. 7, 1992

[54] HYDRAULIC ELEVATOR MUFFLER

[75] Inventors: Richard N. Fargo, Plainville; Sib S. Ray, Newington; Louis Bialy, Simsbury; Henry Ryder, Gales Ferry, all of Conn.

[73] Assignee: Otis Elevator Company, Farmington, Conn.

[21] Appl. No.: 574,186

[22] Filed: Aug. 28, 1990

[51] Int. Cl.$^5$ .................... F16K 47/02; F16L 55/02
[52] U.S. Cl. .................................. 181/233; 181/249; 181/252; 181/264
[58] Field of Search ............... 181/247, 248, 249, 252, 181/255, 271, 233, 264, 265, 266, 267, 277, 278

[56] References Cited

U.S. PATENT DOCUMENTS 3,545,565 12/1970 McCaffrey ..................... 181/264
4,164,266 8/1979 Collin et al. ..................... 181/252
4,671,380 6/1987 Henderson et al. ............. 181/249

Primary Examiner—L. T. Hix
Assistant Examiner—Khanh Dang
Attorney, Agent, or Firm—Lloyd D. Doigan

[57] ABSTRACT

A muffler for attenuating pulsations within the hydraulic fluid of an hydraulic elevator includes a plurality of compressible elements for absorbing pressure pulsations within the fluid and a baffle for ensuring that the flow of fluid contacts the elements sufficiently to absorb such pulsations, the baffle allowing a certain amount of flow to pass therethrough so that the pressure drop around the baffle is not so extreme as to cause the muffler to cease to function.

10 Claims, 1 Drawing Sheet

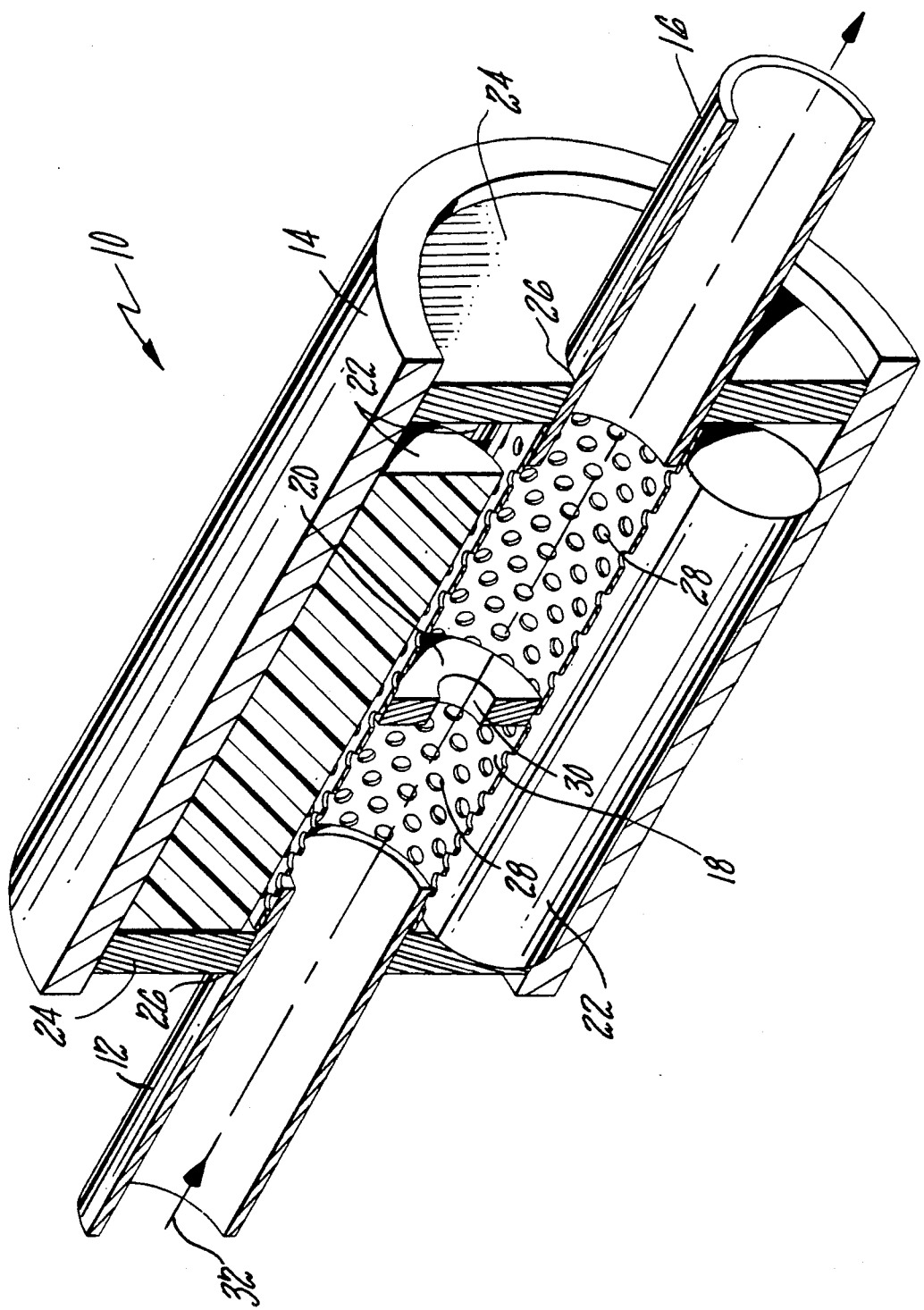

HYDRAULIC ELEVATOR MUFFLER

DESCRIPTION

1. Technical Field

This invention relates to hydraulic elevators and more particularly to a muffler for use in hydraulic elevators.

2. Background Art

Hydraulic elevators are directed upwardly and downwardly by a piston disposed within a cylinder. An hydraulic pump impels hydraulic fluid to and from the cylinder to drive the piston upwardly. The pump is typically powered by an electric motor.

Hydraulic pumps may not run perfectly, imparting pressure pulsations within the hydraulic fluid. Such pressure pulsations may be transmitted to the elevator causing noise and vibration therein. The pulsations may also stimulate resonant modes of vibration in adjoining machinery thereby causing additional vibration and noise in the elevator. Such noise and vibration is clearly undesirable.

Some methods, such as baffles, gas trapping, and spring loaded bladders, have been used to attenuate these pulsations. Such methods, however, have drawbacks, such as high cost, high pressure drops, or poor effectiveness.

A new apparatus for attenuating pulsations in hydraulic fluid used in hydraulic elevators is required.

DISCLOSURE OF THE INVENTION

It is an object of the invention to attenuate pressure pulsations within the hydraulic fluid of an hydraulic elevator effectively, with low cost and with low pressure drop.

According to the invention, a muffler for attenuating pulsations within the hydraulic fluid of an hydraulic elevator includes a plurality of compressible elements for absorbing pressure pulsations within the fluid and a baffle for ensuring that the flow of fluid contacts the elements sufficiently to absorb such pulsations, the baffle allowing a certain amount of flow to pass therethrough so that the pressure drop around the baffle is not so extreme so as to cause the muffler to cease to function.

According to a feature of the invention, the elements are comprised of closed-cell urethane having a bulk modulus of about twice the maximum operating pressure of the hydraulic elevator.

The foregoing and other objects, features and advantages of the present invention will become more apparent in light of the following detailed description and accompanying drawing.

BRIEF DESCRIPTION OF THE DRAWING

The figure is a perspective view, partially broken away, of an embodiment of a hydraulic elevator muffler of the invention.

BEST MODE FOR CARRYING OUT THE INVENTION

Referring to the figure, an hydraulic elevator muffler 10, for attenuating the pulsations of a hydraulic pump (not shown) used in an hydraulic elevator (not shown), is shown. The muffler comprises an inlet pipe 12, a housing 14, an outlet pipe 16, a cylindrical screen 18, a baffle 20, and one or more compressible elements 22.

All the parts, except for the compressible element(s), are constructed of steel.

The housing 14 is cylindrically shaped having a pair of disk-shaped end caps 24. Each end cap has an opening 26 for receiving a medial portion of either the inlet pipe 12 and the outlet pipe 16. The end caps are attached by a conventional method, such as welding, to the housing and to the inlet and outlet pipes to provide a fluid tight seal.

The cylindrical screen 18 has a plurality of symmetrically located circular openings 28 to allow hydraulic fluid to flow therethrough. The screen has an inner diameter which fits over the outer diameter of the inlet and outlet pipes 12, 16 respectively. The screen defines a central flow path 32 of hydraulic fluid through the muffler.

The baffle 20 is disk-shaped and has an aperture 30 extending centrally therethrough. The baffle is located within the screen 18 between the inlet and outlet pipes and perpendicularly to the central flow path 32 of hydraulic fluid.

The cylindrical compressible elements 22 are disposed within the cylindrical housing 14 radially outwardly from the screen 18. The compressible elements, which are constructed of a foamed, closed-cell polyurethane having a durometer hardness of approximately 75±5 and having a weight of approximately 345 grams for a tubular piece having a length of 22.61 centimeters and a diameter of 5.08 centimeters (i.e. a density of about 0.75 grams per cubic centimeter), are manufactured by Mueller Belting of Saddlebrook, N.J.

The compressible elements should have a bulk modulus of about twice the maximum operating pressure of the hydraulic elevator. As the hydraulic elevator system (for which the embodiment of a muffler as shown and described herein is used) operates up to 34 atmospheres, the compressible elements should have a bulk modulus of about 68 atmospheres. Elements which are less stiff will be nearly completely compressed at the maximum operating pressure and will not be able to absorb pulses. Conversely, elements which are more stiff will not compress enough to absorb pressure pulsations so as to minimize the effectiveness of the muffler.

In operation, hydraulic fluid is directed from the hydraulic pump through the inlet pipe 12 into the housing 14. The relatively high pressure hydraulic fluid abuts the baffle 20 and passes through the holes 28 in the screen upstream of the baffle to contact the compressible elements 22. The fluid then exits through the holes in the screen downstream of the baffle and through the outlet pipe 16, after contacting the compressible elements. The screen acts as a porous element to allow the fluid to flow outside the central flow path to contact the compressible elements 22.

A certain amount of the hydraulic fluid flows through the aperture 30 in the baffle. The sizing of the aperture in relation to the resistance to flow offered by the screen is vital. If the aperture is too large, the flow will essentially pass through the muffler 10 without contacting the elements. If the aperture is too small, the flow passing through the screen downstream of the baffle creates a large pressure drop which may suck the elements against the screen, thereby blocking the flow therethrough. In the embodiment shown, the aperture has a diameter of approximately 2.22 centimeters in diameter.

The number of compressible elements 22 surrounding the screen may vary depending on system flow rates, the aperture 30 diameter, and the particular characteristics of the compressible elements themselves. However, for the embodiment shown, five elements arranged symmetrically about the screen are preferred.

The embodiment of the invention shown and described above provides a muffler 10 which effectively, at low cost and with a low pressure drop, attenuates the pressure spikes within hydraulic fluid. In some tests, the muffler shown and described has reduced the noise of the pump by 30 dBA.

Although the invention has been shown and described with respect to a best mode embodiment thereof, it should be understood by those skilled in the art that various other changes, omissions, and additions in the form and detail thereof may be made therein without departing from the spirit and scope of the invention. One of ordinary skill in the art will recognize that the specific arrangement and number of elements 22 depends on the flow parameters, characteristics of the elements, and the size of the aperture. One might be able to utilize a single element which encircles the screen if the element provides the desired attenuation characteristics. Also, one of ordinary skill in the art will recognize that the hardness and density of the elements 22 may be modified to attenuate pulsations in the flow of a given elevator system. Further, one of ordinary skill in the art will recognize that the screen may be replaced by other elements, such as spaced rods, hoops, a combination thereof or any other arrangement which allows flow to pass therethrough or therearound to contact the compressible elements while defining a central flow path.

We claim:

1. Apparatus for attenuating pulsations within hydraulic fluid of an elevator comprising;
   a flow passing a flow of hydraulic fluid,
   a baffle disposed in said flow path, said baffle allowing a first portion of said flow to pass therethrough, and a second portion of said flow to pass therearound, and
   a compressible element disposed outside said flow path, said compressible element being in contact with said portion of said flow passing around said means disposed in said flow path to attenuate pulsations in said flow.

2. The apparatus of claim 1 wherein said flow path comprises:
   an inlet,
   an outlet, and
   a porous means having a cross-section defining a closed shape, said porous means being disposed between said inlet and said outlet, said baffle being disposed within said cross-section, said compressible element being disposed outside said cross-section.

3. The apparatus of claim 2 wherein said compressible element comprises;
   a compressible material having a bulk modulus of about twice a maximum operating pressure of said elevator.

4. The apparatus of claim 3 wherein said compressible element further comprises;
   a durometer hardness of about 75±5 and a density of about 0.75 grams per cubic centimeter.

5. The apparatus of claim 1 wherein said compressible element comprises;
   a compressible material having a bulk modulus of about twice the maximum operating pressure of said elevator.

6. The apparatus of claim 5 wherein said compressible element further comprises;
   a durometer hardness of about 75±5 and a density of about 0.75 grams per cubic centimeter.

7. The apparatus of claim 2 wherein said compressible element comprises;
   five cylindrical elements disposed symmetrically about said flow path.

8. The apparatus of claim 1 wherein said compressible element comprises;
   five cylindrical elements disposed symmetrically about said flow path.

9. Apparatus for attenuating pulsations within hydraulic fluid of an hydraulic elevator comprising;
   means defining a flow path passing a flow of hydraulic fluid, said means allowing flow to pass therethrough,
   a baffle disposed in said means defining a flow path, said baffle allowing a first portion of said flow to pass therethrough, and a second portion of said flow to pass therearound,
   a compressible element disposed outside said means defining a flow path, said compressible element being in contact with said portion of said flow passing around said baffle means to attenuate pulsations in said flow.

10. Apparatus for attenuating pulsations within hydraulic fluid of an hydraulic elevator comprising;
    a flow path passing a flow of hydraulic fluid,
    a baffle disposed in said flow path, said baffle having a hole disposed therein for allowing a first portion of said flow to pass therethrough, said baffle allowing a second portion of said flow to pass therearound, and
    a compressible element disposed outside said flow path, said compressible element being in contact with said portion of said flow passing around said means to attenuate pulsations in said flow.

* * * * *